US012694123B2

(12) United States Patent
Singh et al.

(10) Patent No.: US 12,694,123 B2
(45) Date of Patent: Jul. 28, 2026

(54) SYSTEM AND METHOD FOR DEFENSE IN DEPTH OF ONE OR MORE SOFTWARE DELIVERY PIPELINES

(71) Applicant: Guardian Life Insurance Company of America, New York, NY (US)

(72) Inventors: Manas Singh, Chappaqua, NY (US); Karan Pratap Singh, Edison, NJ (US); Naveen Kumar S, Tamil Nadu (IN); Daniel Johnson, Slingerlands, NY (US)

(73) Assignee: Guardian Life Insurance Company of America, New York, NY (US)

( * ) Notice: Subject to any disclaimer, the term of this patent is extended or adjusted under 35 U.S.C. 154(b) by 259 days.

(21) Appl. No.: 18/373,596

(22) Filed: Sep. 27, 2023

(65) Prior Publication Data

US 2025/0103721 A1    Mar. 27, 2025

(51) Int. Cl.
*G06F 21/57* (2013.01)
*G06F 8/60* (2018.01)

(52) U.S. Cl.
CPC .............. *G06F 21/577* (2013.01); *G06F 8/60* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 9,521,160 | B2 | 12/2016 | Ng et al. | |
| 10,491,624 | B2 | 11/2019 | Ng et al. | |
| 10,740,469 | B2 * | 8/2020 | Zheng | G06F 8/427 |
| 11,611,578 | B2 * | 3/2023 | Kibler | G06F 11/301 |
| 2019/0173893 | A1 | 6/2019 | Muddu et al. | |
| 2020/0396246 | A1 | 12/2020 | Zoldi et al. | |
| 2024/0248995 | A1 * | 7/2024 | Gazit | G06F 8/77 |

* cited by examiner

*Primary Examiner* — Atta Khan
(74) *Attorney, Agent, or Firm* — Carter Ledyard & Milburn LLP

(57) ABSTRACT

A system and method for defense in depth, which employs a feedforward orchestrator, of at least one software delivery pipeline includes a security context and the feedforward orchestrator being configured to analyze the security context for each stage of the software delivery pipeline to mitigate security vulnerabilities. The system and method also implement security controls with at least one feedforward technique. Also, the feedforward orchestrator continuously employs feedback of the system to inform subsequent stages or subsequent layers of integration and deployment functions of the at least one software delivery pipeline.

11 Claims, 5 Drawing Sheets

200

```
* * * name: project
version: 0.0.1
license: MIT
dependencies:
  - name: mongo-express
    version: 0.52.0
    description: Web-based admin interface for MongoDB
    repository: git://github.com/mongo-express/mongo-express.git
    license: MIT
    cves:
        - id: CVE-2019-10758
          severity: HIGH
          impact_score: 10.0
        - id: CVE-2020-24391
          severity: HIGH
          impact_score: 6.4
        - id: CVE-2021-23372
          severity: MEDIUM
          impact_score: 3.9
        - id: CVE-2021-21422
          severity: MEDIUM
          impact_score: 3.9
    kevs:
      - cveID: CVE-2019-10758
        vendorProject: MongoDB
        product: mongo-express
        vulnerabilityName: MongoDB mongo-express Remote Code Execution Vulnerability
        dateAdded: "2021-12-10"
        shortDescription: mongo-express before 0.54.0 is vulnerable to Remote Code Execution via endpoints.
        requiredAction: Apply updates per vendor instructions.
        dueDate: "2022-06-10"
    epss:
        cve: CVE-2019-10758
        epss: "0.973730000"
        percentile: "0.990420000"
        date: "2023-06-10"
        cve: CVE-2020-24391
        epss: "0.455120000"
        percentile: "0.960900000"
        date: "2023-06-10"
        cve: CVE-2021-23372
        epss: "0.000900000"
        percentile: "0.369930000"
        date: "2023-06-10"
        cve: CVE-2021-21422
        epss: "0.000800000"
        percentile: "0.330000000"
        date: "2023-06-10"
```

| Name | Version | License | CVE | KVE | EPSS |
|------|---------|---------|-----|-----|------|
| express | 4.18.2 | MIT | 2 High 2 Medium | – | 0.76% |
| lodash | 4.17.21 | MIT | 4 Medium | – | 0.47% |
| react | 18.2.0 | MIT | 3 High 1 Low | – | 0.43% |
| mongo-express | 0.52.0 | MIT | 2 High 2 Medium | 1 | 35.84% |
| loose-envify | 1.1.0 | MIT | – | – | 0% |
| js-tokens | 1.0.1 | MIT | – | – | 0% |
| body-parser | 1.18.3 | MIT | 1 High | – | 0.19% |
| accepts | 1.3.8 | MIT | 4 High | – | 0.82% |
| array-flatten | 1.1.1 | MIT | – | – | 0% |
| bytes | 3.0.0 | MIT | 1 High 2 Medium 1 Low | – | 0.57% |
| mime-types | 2.1.34 | MIT | 1 High 2 Medium | – | 0.10% |
| negotiator | 0.6.3 | MIT | 1 Medium | – | 0.10% |
| mime-db | 1.51.0 | MIT | – | – | 0% |
| content-type | 1.0.4 | MIT | 2 High 2 Medium | – | 0.57% |

Figure 4

SYSTEM AND METHOD FOR DEFENSE IN DEPTH OF ONE OR MORE SOFTWARE DELIVERY PIPELINES

TECHNICAL FIELD

This disclosure relates to defense in depth and, more particularly, to systems and methods for defense in depth, via a feedforward orchestrator, of one or more software delivery pipelines.

BACKGROUND

Software delivery pipelines are crucial components in development and deployment of software applications. These pipelines, however, usually face security threats (e.g., malicious code introductions, vulnerabilities, and unauthorized access).

Prior to this disclosure, traditional security measures typically focused on feedback-based, reactive approaches, such as vulnerability scanning (e.g., the process of discovering, analyzing, and reporting on security flaws and vulnerabilities) and penetration testing (a cybersecurity technique that organizations use to identify, test and highlight vulnerabilities in their security posture, sometimes through an "ethical hacker," or an information security expert who penetrates a computer system, network, application or other computing resource on behalf of its owners, and with their authorization). While these feedback-based measures are important, they may not be enough to provide comprehensive protection against emerging threats, particularly threats directed to the dynamic functions of software delivery pipelines.

Defense in depth is a security strategy that involves implementing multiple layers of security controls to mitigate risks. Existing defense in depth approaches in software delivery pipelines often rely on feedback mechanisms that address vulnerabilities reactively and retroactively and are siloed across each of the pipelines' stages.

It is therefore desirable to develop a system and method that incorporates feedforward mechanisms (e.g., proactive and preemptive mechanisms), which would enable feedback obtained from one security layer to inform and improve subsequent security layers in real-time.

SUMMARY OF THE DISCLOSURE

In one implementation, a system for defense in depth of at least one software delivery pipeline employs a feedforward orchestrator. The system includes a continuous integration and continuous deployment pipeline comprising a plurality of stages. The pipeline also includes a security context for each stage of the continuous integration and continuous deployment pipeline, along with the feedforward orchestrator being configured to analyze the security context for each stage of the continuous integration and continuous deployment pipeline. The feedforward orchestrator, following its analysis of the security context for each stage of the continuous integration and continuous deployment pipeline, may mitigate security vulnerabilities and implement additional security controls with at least one feedforward technique.

One or more of the following features may be included. The system may include at least one feedforward technique comprising at least one vulnerability evaluation and at least one runtime application security measure. The system may include at least one feedforward technique including a step of generating a layer of security controls in the at least one software delivery pipeline. The system may include the feedforward orchestrator employing feedback from at least one security scan and informing subsequent security contexts of the continuous integration and continuous deployment pipeline. The system may include the feedforward orchestrator being in communication with an application vulnerability correlation platform, a vulnerability exploitability exchange, and an application security posture score module.

In another implementation, a system for defense in depth of at least one software delivery pipeline employs a feedforward orchestrator. The system includes the at least one software delivery pipeline comprising a static application security testing module and a dynamic application security testing module. The system further includes a security context from each of the static application security testing module and the dynamic application security testing module. The system also includes at least one security scan module configured to communicate security scan information based on the security context from each of the static application security testing module and the dynamic application security testing module, wherein the feedforward orchestrator is configured to analyze the security context from each of the static application security testing module and the dynamic application security testing module and implement at least one security control. Also, the at least one security control has an application security posture management process and a policy generator, wherein the feedforward orchestrator continuously employs feedback of the at least one security scan module and the at least one security control to inform subsequent stages or layers of integration and deployment functions of the at least one software delivery pipeline.

One or more of the following features may be included. The system may include the application security posture management process comprising an annotator, an exploit prediction scoring system, known exploited vulnerabilities, a national vulnerability database, and a plurality of graphs. The system may include the policy generator comprising a runtime application security protection module, an IP whitelisting module, and web firewall rules. The system may include the feedforward orchestrator employing feedback of the at least one security scan module and the at least one security control for generating additional security controls. The system may include the additional security controls further comprising at least one layer of security controls placed in the at least one software delivery pipeline In another implementation, a method for defense in depth, which employs a feedforward orchestrator, of at least one software delivery pipeline, includes initiating an application that includes at least one feedforward module; starting security scans and tests in the at least one software delivery pipeline; sending security information from the at least one software delivery pipeline to the feedforward orchestrator; scanning a security stage of the at least one software delivery pipeline for system security issues; creating a security context of the stage; analyzing the security context of the security stage; generating security controls to mitigate vulnerabilities obtained from analyzing the security context of the stage; and implementing analysis of the security context in a subsequent stage of the at least one software delivery pipeline through the at least one feedforward technique.

The details of one or more implementations are set forth in the accompanying drawings and the description below. Other features and advantages will become apparent from the description, the drawings, and the claims.

BRIEF DESCRIPTION OF THE DRAWINGS

Various embodiments in accordance with the present disclosure be described with reference to the drawings, in which:

FIG. 2 illustrates an example of an annotated software bill of materials.

FIG. 4 illustrates an example of a vulnerability table.

DETAILED DESCRIPTION OF THE PREFERRED EMBODIMENTS

Figure 1:
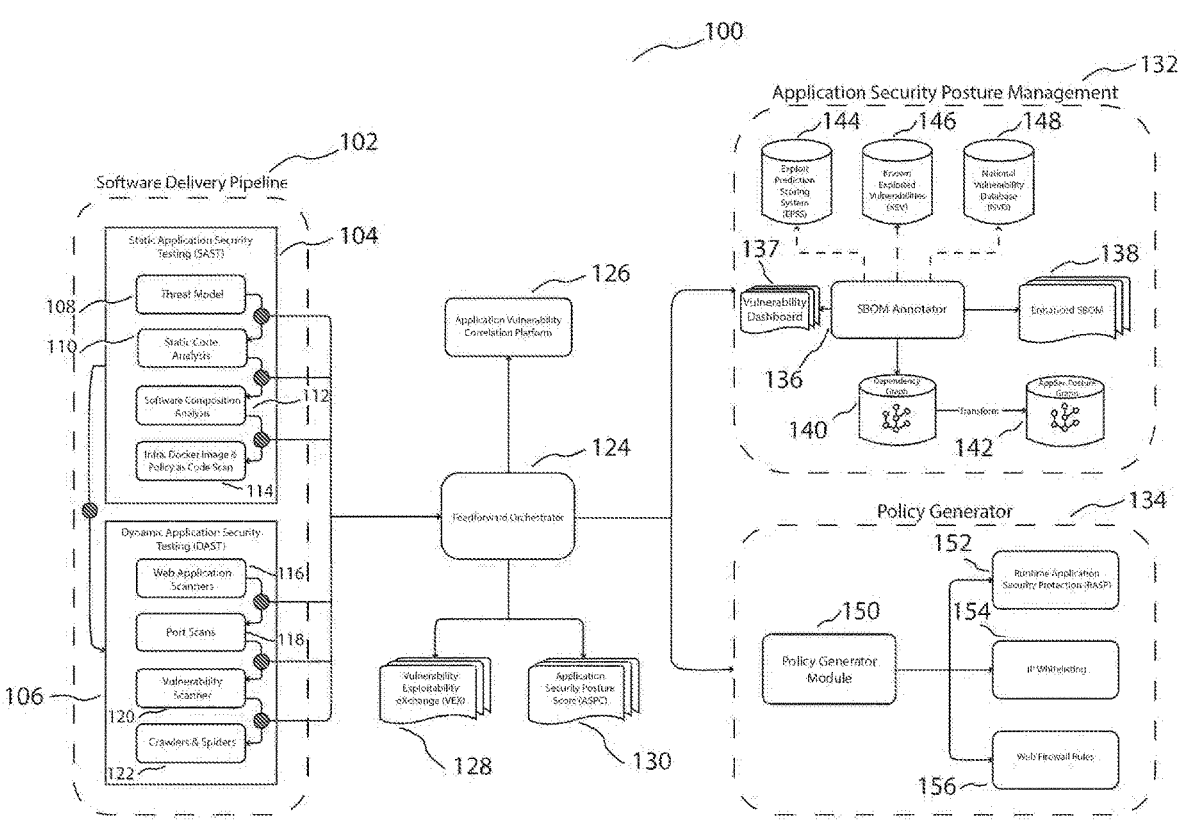
FIG. 1 illustrates an example of a system for defense in depth, which employs a feedforward orchestrator, of at least one software delivery pipeline.

Referring to FIG. 1, there is shown a system for defense in depth of at least one software delivery pipeline 100. A software delivery pipeline 102, which may include typical continuous integration and/or continuous deployment functions having multiple technical stages, may integrate a static application security testing (SAST) module 104 as one stage to scan an application's source, binary, or byte code for security vulnerabilities. Software delivery pipeline 102 may also include a dynamic application security testing (DAST) module 106 for testing a running application and detecting misconfiguration(s) in servers or databases relevant to the application. Each of the modules 104 and 106 may include connectors to enable continuous flow of information between each of their components.

SAST module 104 may further include a threat model 108 which may be generated following SAST module's 104 assessment of an application. Threat model 108, along with application source code, may be subject to static code analysis 110 (e.g., a method of debugging that examines source code without having to execute the code's program) to, for example, detect possible defects that could lead to false positives or false negatives. SAST module 104 may also include a software composition analysis (SCA) module 112 to, for example, analyze open-source packages within an applicant's codebase and identify vulnerabilities. A commercial example of SCA Module 112 is Prisma Cloud SCA by Palo Alto Networks, which may include software composition analysis via, among other things, scans across open source packages and open source dependencies, and a consolidated inventory of pipelines and code paired with visualizations of connections and a generation of a software bill of materials. SAST module 104 may also include scans of infrastructure as code, scans of a docker image, and/or scans of policy as code (collectively enumerated as 114). These scans may yield information that, in combination with information from threat model 108, static code analysis 110, and SCA module 112, may be exchanged with DAST module 106 in the form of a security context, which may then be sent to a feedforward orchestrator 124.

As shown in FIG. 1, DAST Module 106, as another stage, may receive security context information from SAST module 104 and all its components. DAST module 106 may use this information to analyze an application to find vulnerabilities through, for example, simulated attacks. After performing these simulated attacks, DAST Module 106 may then identify security vulnerabilities based on the simulated attack results. DAST Module 106 may perform scans through web application scanners 116 (e.g., running automated monitoring and scans to check for security vulnerabilities or breaches); port scans 118 (e.g., a method of determining which ports on a network are open and could be receiving or sending data so as to, for instance, verify security policies of networks and identify potential vulnerabilities); a vulnerability scanner 120 (e.g., a program to assess for known weaknesses in an application); and crawlers and spiders 122 (e.g., a program that searches and indexes content of an application for future vulnerability references). DAST module 106 may have its own security context following its scans.

Following scans of SAST module 104 and DAST module 106, software delivery pipeline 102 may combine information and results of each module's security contexts via a security scan module (not shown) and exchange the information and results with feedforward orchestrator 124. By doing so, software delivery pipeline 102 prevents SAST module 104 and DAST module 106 from being siloed off from each other, which magnifies the amount of information software delivery pipeline 102 may provide to feedforward orchestrator 124. In other words, software delivery pipeline 102 acts as an effective input of variables for feedforward orchestrator 124, so that feedforward orchestrator 124 may perform analyses with more informed bases.

Feedforward orchestrator 124 may, following receipt of information of the security scan module, analyze the security context for each stage of software delivery pipeline 102. Analysis may be performed by feedforward orchestrator 124 ingesting information from the security scan module, measuring and evaluating threats and risks posed by the information, performing one or more application security workflows (e.g., via an Application Vulnerability Correlation Platform 126), generating and reading Vulnerability Exploitability exchange (VEX) documents 128, and summarizing an overall security state of an application via an Application Posture Security Score (ASPC) 130 (e.g., with one or more electronic documents). Feedforward orchestrator 124 may also use at least one feedforward technique, such as: a runtime application security measure; runtime application security protection; generating a layer of security controls for use in software delivery pipeline 102, using feedback from the security controls and/or the security scan module to inform subsequent security contexts of software delivery pipeline 102 and/or create additional security controls. The additional security controls may be placed or employed in software delivery pipeline 102 to create a defense in depth structure for system 100.

Additional examples of feedforward techniques that may be used by feedforward orchestrator 124 may further include: using network traffic models to predict impending spikes in traffic that could overwhelm systems and then proactively scale up resources to handle the spike before it happens; analyzing data on new malware threats and making predictive models of how they may spread and quarantining systems or distributing patches proactively before infections occur; forecasting potential vulnerabilities based on software update schedules and proactively test systems and deploy fixes on the expected release date; forecasting types of defects based on code analysis and proactively update coding practices and testing to prevent those defects.

Feedforward orchestrator 124 may facilitate an application security posture management process 132 and a policy generator 134 in creating security controls to counteract threats and vulnerabilities that feedforward orchestrator 124 received, analyzed, and ultimately perceived. Without recursion or backtracking, feedforward orchestrator 124 may develop security controls in multiple iterations, with each iteration of security controls becoming a security layer in a defense in depth system.

Feedforward orchestrator 124, in performing the exemplary feedforward functions or techniques described above, uses information about a system's current state (e.g., the state of software delivery pipeline 102) and possesses a desired target (e.g., creating security controls to counteract potential threats within software delivery pipeline 102). Feedforward orchestrator 124 proactively adjusts the inputs of information from software delivery pipeline 102 to achieve the target. Some aspects of feedforward orchestrator 124 may include: using predictive models and current state measurements to determine the appropriate control inputs needed to reach a target state; acting proactively to direct the system toward the target, rather than just reacting to errors (i.e., feedforward controllers act even when the current output is correct if it is known that errors will occur without intervention); and requiring knowledge about the system and target to determine the right control inputs to apply. Predictive feedforward techniques, some examples of which are provided above, enable feedforward orchestrator 124 to construct layers of security to enhance defense in depth structures and functions within system 100.

After feedforward orchestrator 124 completes its analysis, feedforward orchestrator 124 may generate security controls. An example of one of the security controls include a software bill of materials that feedforward orchestrator 124 may create via application security posture management process 132. Another example of a security control from feedforward orchestrator 124 may include policy generator 134.

Application Security Posture Management process 132 may include a mechanism for ingesting information from feedforward orchestrator 124. With this information, an SBOM annotator 136 may annotate an SBOM to create an enhanced SBOM 138 as, for example, an output of documents. Enhanced SBOM 138 may include content from a previously drafted SBOM, and the SBOM annotator 136 may be responsible for modifying the previously drafted SBOM with information from feedforward orchestrator 124 to render the previously drafted SBOM into an enhanced SBOM. SBOM annotator 136 may also annotate other enhanced SBOMs from a different system or from a different software delivery pipeline.

SBOM Annotator 136 may also generate, as an output, a Vulnerability Dashboard 137. Vulnerability dashboard 137 may be one or more documents or one or more application interfaces. Vulnerability dashboard 137 may include a management mechanism and/or a dynamic interface that displays data, metrics, and insights for a vulnerability management program. Vulnerability dashboard 137 may provide a single platform for viewing all vulnerability information associated with software delivery pipeline 102. Vulnerability dashboard 137 may present a number of exploitable vulnerabilities within software delivery pipeline 102. Vulnerability dashboard 137 may also present key performance indicators (e.g., measurable metrics that track progress towards a vulnerability-related goal; sometimes abbreviated as "KPIs") for vulnerability remediation.

Other capabilities of SBOM annotator 136 may include its exchange of information with databases, including an Exploit Prediction Scoring System (EPSS) 144 (e.g., a data-driven process for estimating the likelihood that a software vulnerability will be exploited in a vendor's system), a Known Exploited Vulnerabilities (KEV) database 146 (e.g., a catalog of past vulnerability events provided by the Cybersecurity & Infrastructure Security Agency), and a National Vulnerability (NVD) 148 database (e.g., a U.S. government repository of standards based on vulnerability management data). SBOM annotator 136 may use information from these databases in annotating enhanced SBOM 138 and in developing a dependency graph 140.

Dependency graph 140 may represent dependencies of several objects towards each other within system 100. Dependency graph 140 may be accessed by an administrator to better understand vulnerabilities and their relationships to components of system 100. For each dependency, an administrator may see license information and vulnerability severity. FIG. 2, which will be discussed in detail, represents an example of a dependency graph for a system resembling that of system 100.

Dependency graph 140 may be transformed into an application security (AppSec) posture graph 142 to enable efficient evaluations of system security posture. In other words, AppSec posture graph 142 lets an administrator analyze any changes to security posture without having to tediously review every single dependency of dependency graph 140 for vulnerability or compliance issues.

Policy generator 134 may include a mechanism for ingesting information from feedforward orchestrator 124. With this information, a policy generator module 150 may create policies to safeguard against vulnerabilities shared by feedforward orchestrator 124. Policy generator module 150 may, for instance, generate policies for use in an operating security technology like Runtime Application Security Protection (RASP) 152. Policy generator module 150 may also inform activities of IP Whitelisting 154 to allow some identified entities access to particular privileges, services, mobilities, or recognitions (i.e., a list of things that are allowed while everything else is denied by default for security purposes). Policy generator module 150 may further contribute to web firewall rules 156 (i.e., major components of firewall policies that determine which types of traffic your firewall allows in and out of your network, and which are blocked).

The security controls may behave as output information based on feedforward orchestrator 124 and its analytical capabilities. The security controls may be rendered as a layer of security in a defense in depth structure for system 100. The output information may be incorporated into software delivery pipeline 102 or another software delivery pipeline. The output information incorporated into software delivery pipeline 102 may then be scanned by modules 104 and 106 to yield information for feedforward orchestrator 124 to determine additional security controls, if needed. The additional security controls may then create yet another layer of security in a defense in depth fashion.

Referring to FIG. 2, there is shown an example of an annotated software bill of materials (SBOM) 200. Annotated SBOM 200 may resemble a document of enhanced SBOM 138 or resemble a document used to create enhanced SBOM 138. Annotated SBOM 200 includes annotations to provide additional context and information about each of its listed components. Annotated SBOM 200 may include version information, licensing information, vulnerability information, origin and source, usage and functionality, and lifecycle information. Annotated SBOM 200 may also present dependencies and data from databases (e.g., EPSS 144 and KEV 146 and common vulnerabilities and exposures). Annotated SBOM 200 may also show impact scores, descriptions, required actions, percentiles, and repositories.

Figure 3:
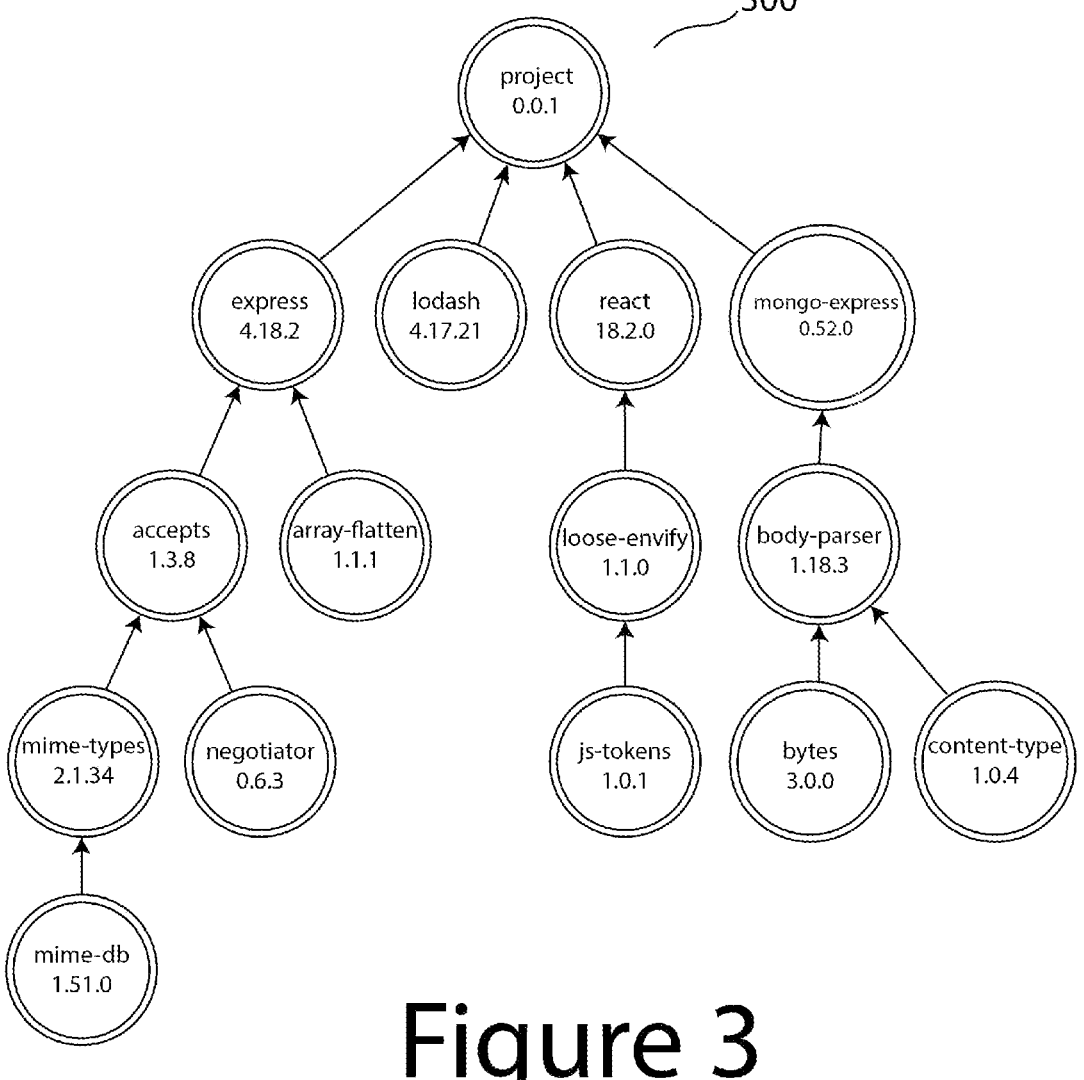
FIG. 3 illustrates an example of a dependency graph.

Referring to FIG. 3, there is shown an example of a dependency graph 300 for a system resembling the system 100 of FIG. 1. Dependency graph 300 may include a plurality of dependencies represented with circles. Dependency graph 300 may also include information related to version numbers, reference counts, vulnerability scores, and/or usage metrics. Information from dependency graph 300 may also show modules that provide access to databases. Dependency graph 300 may further include information regarding libraries, such as lodash and react. Overall, dependency graph 300 may be generated by system 100 and be used to inform other systems or feedforward orchestrator 124 in other developing defense in depth systems.

Referring to FIG. 4, there is shown an example of a vulnerability dashboard document 400. Vulnerability dashboard document 400 may be in the form of a table. Vulnerability dashboard 400 may present one or more names of programs, databases, dependencies, parsers, libraries, etc. Vulnerability Dashboard 400 may further include version numbers pertaining to a relevant program or other software entity, as well as license information for each software entity. Each software entity may also have information regarding their common vulnerabilities and exposures (CVE), which would be provided from SBOM annotator 136 or feedforward orchestrator 124 or software delivery pipeline 102. CVE information may include a list of publicly disclosed computer security flaws and may be presented in Vulnerability Dashboard 400 following comparison of the list with the characteristics of a software entity (e.g., if a software entity's infrastructure resembles something from the list, then CVE information would be displayed as a low, medium, or high priority item, depending on the severity and resemblance of the vulnerability). A quantity of known exploited vulnerabilities (KEVs) may be associated with a software entity following functions of SBOM annotator 136 and/or feedforward orchestrator 124 (e.g., a mongo-express item may be listed as having one KEV). KEVs are a subset of known vulnerabilities that have been actively exploited across computer frameworks. In other words, KEVs are a compilation of documented security vulnerabilities that have been successfully exploited. KEVs are a prime target for attacks because threat actors can follow an established method for exploiting these security flaws. The United States Cybersecurity and Infrastructure Security Agency maintains a KEV catalog. The catalog is a tabulated inventory of vendor-organized software flaws that have been exploited by cyberattacks. Examples of KEVs include a loosely secured cloud storage system that allows attackers to access sensitive data, and an open network port on a server that is further exploited through the installation of command and control malware. A scoring system, such as the exploit prediction score system (EPSS), may be associated with each software entity. EPSS is a framework that predicts the probability of a vulnerability being exploited. EPSS uses a percentage for probability and calculates a score for each vulnerability. The goal of EPSS is to help network defenders prioritize vulnerability remediation efforts. PSS is a data-driven effort that uses machine learning and algorithms. It combines descriptive information about CVEs with evidence of actual exploitation. The EPSS indicator may quantify the probability of exploiting a given vulnerability in the next 30 days. EPSS is often used to help identify high risk vulnerabilities to prioritize for remediation.

Figure 5:
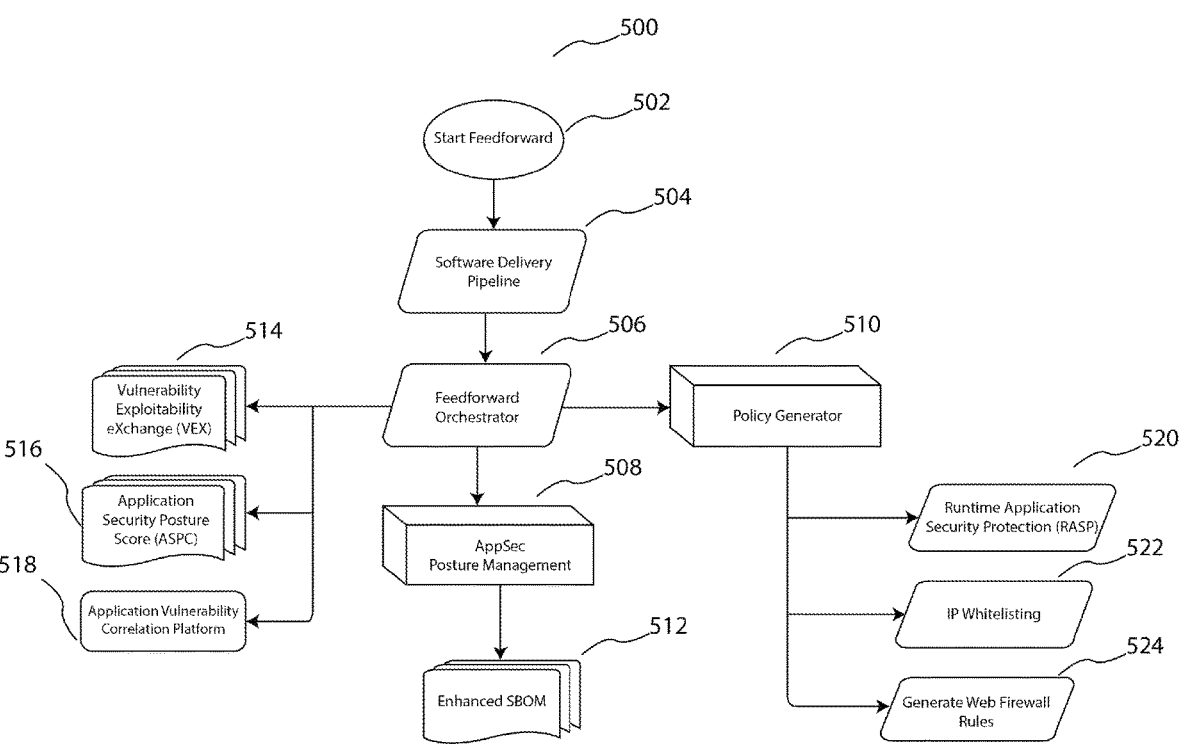
FIG. 5 illustrates an example of a method for defense in depth, which employs a feedforward orchestrator, of at least one software delivery pipeline.

Referring to FIG. 5, there is shown a flowchart illustrating a method 500 for defense in depth, which employs a feedforward orchestrator, of at least one software delivery pipeline. The method begins with initiating scans via feedforward module 502. The module may be used by an administrator or a program. The module may also be used on an application interface or on an application terminal.

Feedforward module 502 initiates processes of software delivery pipeline 504 which may include security tests and scans of software delivery pipeline 504. These processes may yield security information, particularly vulnerabilities, risks, and/or compliance issues. The security information may then be exchanged with a feedforward orchestrator 506, which may possess similar capabilities to feedforward orchestrator 124 of FIG. 1. Feedforward orchestrator 506 may receive the security information in the form of security stages, wherein, for example, one security stage contains security information from static application security testing and another security stage contains security information from dynamic application security testing. Feedforward orchestrator 506 may then employ feedforward techniques and functions like those described for feedforward orchestrator 124 to analyze the security stages and to create a security context for each stage. Analysis functions of feedforward orchestrator 506 may include measuring and evaluating threats and risks posed by the information of the security stages, performing one or more application security workflows (e.g., via an Application Vulnerability Correlation Platform 518), generating and reading Vulnerability Exploitability exchange (VEX) documents 514, and summarizing an overall security state of an application via an Application Posture Security Score (APSC) 516 (e.g., with one or more electronic documents). Each security context for each stage may then be further analyzed by feedforward orchestrator 506 to inform what security controls feedforward orchestrator 506 may generate. Feedforward orchestrator 506, like feedforward orchestrator 124, may possess a target to mitigate vulnerabilities obtained from analyzing the security context for each stage. To achieve this target, feedforward orchestrator 506 may, for example, generate, exchange, and/or use electronic documents, such as Vulnerability Exploitability exchange (VEX) documents 514 and documents pertaining to an Application Security Posture Score (ASPC) module 516. Feedforward orchestrator 506 may use these documents and have mechanisms to generate security controls through, for example, an Application Security Posture Management Process 508 and a policy generator 510. Application Security Posture Management Process 508 may resemble Application Security Posture Management 132 in FIG. 1. Policy generator 510 may resemble policy generator 134 in FIG. 1. The security controls may implement analysis of feedforward orchestrator 506. Moreover, the same analysis may be used in a subsequent stage of the at least one software delivery pipeline through at least one feedforward technique employed by feedforward orchestrator 506. Use of the same analysis in a subsequent stage may create a security layer in a defense in depth system. Method 500 may be repeated a plurality of times to generate additional security layers in a defense in depth fashion.

Application Security Posture Management Process 508 may generate an enhanced SBOM 512. Enhanced SBOM 512 may include content from a previously drafted SBOM or be a first version of a new SBOM.

Policy generator 510 may include a mechanism for ingesting information from feedforward orchestrator 506. With this information, policy generator 510 may create policies to safeguard against vulnerabilities shared by feedforward orchestrator 506. Policy generator 510 may, for instance, generate policies for use in an operating security technology like Runtime Application Security Protection (RASP) 520. Policy generator 506 may also inform activities of IP Whitelisting 522 to allow some identified entities access to particular privileges, services, mobilities, or recognitions (i.e., a list of things that are allowed while everything else is denied by default for security purposes). Policy generator 506 may further contribute to web firewall rules 524 (i.e., major components of firewall policies that determine which types of traffic your firewall allows in and out of your network, and which are blocked).

General

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented system for defense in depth, which employs a feedforward orchestrator, of at least one software delivery pipeline, the system comprising:
   one or more processors;
   a memory;
   a continuous integration and continuous deployment pipeline comprising a plurality of stages;
   a security context for each stage of the continuous integration and continuous deployment pipeline; and
   the feedforward orchestrator stored in the memory and executed by the one or more processors, being configured to analyze the security context for each stage of the continuous integration and continuous deployment pipeline;
   wherein the feedforward orchestrator, following its analysis of the security context for each stage of the continuous integration and continuous deployment pipeline, mitigates security vulnerabilities and implements additional security controls with at least one feedforward technique.

2. The system as claimed in claim 1, wherein the at least one feedforward technique further comprises at least one vulnerability evaluation and at least one runtime application security measure.

3. The system as claimed in claim 1, wherein the at least one feedforward technique further comprises generating a layer of security controls in the at least one software delivery pipeline.

4. The system as claimed in claim 1, wherein the feedforward orchestrator employs feedback from at least one security scan and informs subsequent security contexts of the continuous integration and continuous deployment pipeline.

5. The system as claimed in claim 1, wherein the feedforward orchestrator is in communication with an application vulnerability correlation platform, a vulnerability exploitability exchange, and an application security posture score module.

6. A computer-implemented system for defense in depth, which employs a feedforward orchestrator, of at least one software delivery pipeline, the system comprising:
   one or more processors;
   a memory;
   the at least one software delivery pipeline stored in the memory and comprising
      a static application security testing module executable by one or more processors;
      a dynamic application security testing module executable by the one or more processors;
      a security context from each of the static application security testing module and the dynamic application security testing module; and
      at least one security scan module executable by the one or more processors and configured to communicate security scan information based on the security context from each of the static application security testing module and the dynamic application security testing module;
   wherein the feedforward orchestrator, executable by the one or more processors, is configured to:
      analyze the security context from each of the static application security testing module and the dynamic application security testing module and implement at least one security control, wherein the at least one security control comprising a software bill of materials generator and a policy generator;
   wherein the feedforward orchestrator continuously employs feedback of the at least one security scan module and the at least one security control to inform subsequent stages or layers of integration and deployment functions of the at least one software delivery pipeline.

7. The system as claimed in claim 6, wherein the software bill of materials generator comprises an annotator, an exploit prediction scoring system, known exploited vulnerabilities, a national vulnerability database, and a plurality of graphs.

8. The system as claimed in claim 6, wherein the policy generator comprises a runtime application security protection module, an IP whitelisting module, and web firewall rules.

9. The system as claimed in claim 6, wherein the feedforward orchestrator employs feedback of the at least one security scan module and the at least one security control for generating additional security controls.

10. The system as claimed in claim 9, wherein the additional security controls further comprise at least one layer of security controls placed in the at least one software delivery pipeline.

11. A method for defense in depth, which employs a feedforward orchestrator, of at least one software delivery pipeline, the method comprising:

initiating an application that includes at least one feed-forward module;

starting security scans and tests in the at least one software delivery pipeline;

sending security information from the at least one software delivery pipeline to the feedforward orchestrator;

scanning a security stage of the at least one software delivery pipeline for system security issues;

creating a security context of the security stage;

analyzing the security context of the security stage;

generating security controls to mitigate vulnerabilities obtained from analyzing the security context of the security stage; and implementing analysis of the security context in a subsequent stage of the at least one software delivery pipeline through the at least one feedforward technique.

\* \* \* \* \*